(12) United States Patent
Codilian et al.

(10) Patent No.: US 6,930,848 B1
(45) Date of Patent: Aug. 16, 2005

(54) BACK EMF VOLTAGE TRANSDUCER/ GENERATOR TO CONVERT MECHANICAL ENERGY TO ELECTRICAL ENERGY FOR USE IN SMALL DISK DRIVES

(75) Inventors: Raffi Codilian, Irvine, CA (US); Kamran Oveyssi, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 401 days.

(21) Appl. No.: 10/185,932

(22) Filed: Jun. 28, 2002

(51) Int. Cl.[7] .............................................. G11B 33/12
(52) U.S. Cl. ........................ 360/69; 310/15; 320/114; 320/140
(58) Field of Search .......................... 360/69, 71, 75, 360/137; 310/15, 36; 320/107, 114, 137, 140

(56) References Cited

U.S. PATENT DOCUMENTS

| | | | |
|---|---|---|---|
| 5,001,685 A | | 3/1991 | Hayakawa |
| 5,630,155 A | | 5/1997 | Karaki et al. ............... 713/340 |
| 5,714,812 A | * | 2/1998 | Koenck et al. ............... 310/74 |
| 5,714,941 A | * | 2/1998 | Gandre ........................ 340/671 |
| 5,740,132 A | | 4/1998 | Ohshima et al. |
| 5,838,138 A | | 11/1998 | Henty ......................... 320/107 |
| 5,911,529 A | * | 6/1999 | Crisan ......................... 400/472 |
| 6,242,827 B1 | | 6/2001 | Wolf et al. |
| 2001/0023591 A1 | * | 9/2001 | Maeda et al. |

FOREIGN PATENT DOCUMENTS

JP 09147470 * 6/1997

* cited by examiner

Primary Examiner—David Hudspeth
Assistant Examiner—James L Habermehl
(74) Attorney, Agent, or Firm—Won Tae C. Kim, Esq.; Young Law Firm (57) ABSTRACT

A mobile host device configured to draw electrical energy from an energy storage device includes a disk drive. The disk drive includes a disk drive enclosure including a base, a spindle motor attached to the base, a disk positioned on the spindle motor, a generator and a charging circuit. The generator may be coupled to the disk drive enclosure and/or the mobile host device and generates electrical energy from the motion of the mobile host device and/or disk drive. The charging circuit is configured to charge the energy storage device using the electrical energy generated by the generator.

98 Claims, 7 Drawing Sheets

BACK EMF VOLTAGE TRANSDUCER/ GENERATOR TO CONVERT MECHANICAL ENERGY TO ELECTRICAL ENERGY FOR USE IN SMALL DISK DRIVES

BACKGROUND OF THE INVENTION

1. Field of the Invention

This invention relates to methods and devices for extending the charge of the energy storage device (e.g., battery) of mobile host devices that include a hard disk drive. More particularly, this invention relates to methods and devices for converting the mechanical energy of the movement of a disk drive containing mobile host device into electrical energy to charge the energy storage device of the host device.

2. Description of the Prior Art and Related Information

The growing popularity of portable electronic devices has coincided with significant advances in both the storage capacity of current hard disk drives as well as their miniaturization. Indeed, high capacity and inexpensive disk drives having a form factor of less than two inches are now widely available. The manufacturers of portable devices such as still and video cameras, portable digital assistants (PDAs), music players, telephones and mobile computing devices have taken note and have begun widely incorporating disk drives in the devices they manufacture. In portable electronic systems, the capacity of the rechargeable battery determines the length of time the user may operate his or her system in an uninterrupted fashion. The disk drives of such systems, however, consume a considerable amount of the power supplied by the energy storage device (typically, a rechargeable battery). Conventional approaches to lengthening the time during which such systems may operate from the battery tend to concentrate on minimizing the peak power required from the battery. However, such approaches focus on power consumption and do not address the issue of the total amount of power available to be supplied to the mobile host device. More particularly, these approaches do not operate to recharge the battery to actually increase the amount of power available to be supplied to the host device.

SUMMARY OF THE INVENTION

This invention can be regarded as a mobile host device configured to draw electrical energy from an energy storage device, the mobile host device comprising a disk drive, the disk drive comprising a disk drive enclosure including a base; a spindle motor attached to the base; a disk positioned on the spindle motor; a generator, the generator being coupled to one of the disk drive enclosure and the mobile host device, the generator generating electrical energy from a motion of the mobile host device, and a charging circuit, the charging circuit being configured to charge the energy storage device using the electrical energy generated by the generator.

The energy storage device may be a rechargeable battery. The generator may include a magnet and a conductive coil, the magnet and the coil being configured such that the motion of the mobile host device causes the magnet and the coil to move relative to one another to generate the electrical energy. Alternatively, the magnet and the coil may be configured such that the motion of the mobile host device causes the magnet to move relative to the coil to generate the electrical energy. Alternatively still, the magnet and the coil may be configured such that the motion of the mobile host device causes the coil to move relative to the magnet to generate the electrical energy. The generator may include a generator enclosure; a conductive coil disposed within the generator enclosure and a magnet. The coil and the magnet may be configured such that the motion of the mobile host device causes the coil and the magnet to move relative to one another to generate the electrical energy. The magnet may be disposed within the generator enclosure such that the motion of the mobile host device causes the magnet to oscillate relative to the coil. The generator may comprise a spring configured to enable the magnet to oscillate relative to the coil. The magnet may be sandwiched between a first spring and a second spring and the first and second spring may be configured such that when the motion of the mobile host device causes one of the first and second springs to be in tension, the other of the first and second springs is in compression. The coil may be disposed within the generator enclosure such that the motion of the mobile host device causes the coil to oscillate relative to the magnet. The generator may further include a spring disposed within the generator enclosure, the spring being configured to enable the coil to oscillate relative to the magnet. The coil may be sandwiched between a first spring and a second spring, the first and second spring may be configured such that when the motion of the mobile host device causes one of the first and second springs to be in tension, the other of the first and second springs is in compression.

The generator enclosure may have, for example, a hollow cylindrical shape. The magnet may have a disk shape or a right cylindrical shape, for example. The coil may have a toroidal shape, for example. The generator may be disposed within the disk drive enclosure or may be attached to the outside surface of the disk drive enclosure, for example.

The present invention may also be viewed as a disk drive for use with a mobile device configured to draw electrical energy from an energy storage device, the disk drive including a disk drive enclosure including a base; a spindle motor attached to the base; a disk positioned on the spindle motor; a generator, the generator being coupled to the disk drive enclosure, the generator generating electrical energy from a motion of the disk drive and a charging circuit. The charging circuit may be configured to charge the energy storage device using the electrical energy generated by the generator.

The energy storage device may be a rechargeable battery and the charging circuit may be configured to charge the rechargeable battery. The generator may include a magnet and a conductive coil. The magnet and the coil may be configured such that the motion of the disk drive causes the magnet and the coil to move relative to one another to generate the electrical energy. Alternatively, the magnet and the coil may be configured such that the motion of the disk drive causes the magnet to move relative to the coil to generate the electrical energy. Alternatively still, the magnet and the coil may be configured such that the motion of the disk drive causes the coil to move relative to the magnet to generate the electrical energy. The generator may include a generator enclosure; a conductive coil disposed within the generator enclosure and a magnet. The coil and the magnet may be configured such that the motion of the disk drive enclosure causes the coil and the magnet to move relative to one another to generate the electrical energy. The magnet may be disposed within the generator enclosure such that the motion of the disk drive causes the magnet to oscillate relative to the coil. The generator may further include a spring configured to enable the magnet to oscillate relative to the coil. The magnet may be sandwiched between a first spring and a second spring. The first and second spring may be configured such that when the motion of the disk drive causes one of the first and second springs to be in tension, the other of the first and second springs is in compression. The coil may be disposed within the generator enclosure such that the motion of the disk drive causes the coil to oscillate relative to the magnet. The generator may further include a spring disposed within the generator enclosure. The spring may be configured to enable the coil to oscillate relative to the magnet. The coil may be sandwiched between a first spring and a second spring. The first and second spring may be configured such that when the motion of the disk drive causes one of the first and second springs to be in tension, the other of the first and second springs is in compression. The generator enclosure may have a hollow cylindrical shape, for example. The magnet may have a disk shape or a right cylindrical shape, for example. The coil, for example, may have a toroidal shape. The generator may be disposed within the disk drive enclosure and/or may be attached to the outside surface of the disk drive enclosure, for example.

According to another embodiment thereof the present invention is a method of operating a disk drive, comprising drawing electrical energy from an energy storage device to process and execute commands for reading and writing to the disk; generating electrical energy by converting a motion of the disk drive into electrical energy, and charging the energy storage device using the generated electrical energy. The energy storage device may be a rechargeable battery and the drawing step may draw electrical energy from the rechargeable battery. The generating step may include providing a magnet and a conductive coil, and disposing the magnet and the coil such that the motion of the disk drive causes the magnet and the coil to move relative to one another to generate the electrical energy. Alternatively, the generating step may include providing a magnet and a conductive coil, and disposing the magnet and the coil such that the motion of the disk drive causes the magnet to move relative to the coil to generate the electrical energy. Alternatively still, the generating step may include providing a magnet and a conductive coil, and disposing the magnet and the coil such that the motion of the disk drive causes the coil to move relative to the magnet to generate the electrical energy. The generating step may include providing a generator enclosure; providing a conductive coil disposed within the generator enclosure, and providing a magnet, the coil and the magnet disposed such that the motion of the disk drive enclosure causes the coil and the magnet to move relative to one another to generate the electrical energy. The magnet-providing step may dispose the magnet within the generator enclosure such that the motion of the disk drive causes the magnet to oscillate relative to the coil. The magnet-providing step may also provide a spring within the generator enclosure, the spring being configured to enable the magnet to oscillate relative to the coil. The method may also include a step of sandwiching the magnet between a first spring and a second spring. The first and second spring may be configured such that when the motion of the disk drive causes one of the first and second springs to be in tension, the other of the first and second springs is in compression. The coil-providing step may dispose the coil within the generator enclosure such that the motion of the disk drive causes the coil to oscillate relative to the magnet. The magnet-providing step may also provide a spring within the generator enclosure. The spring may be configured to enable the coil to oscillate relative to the magnet. The method may also include a step of sandwiching the coil between a first spring and a second spring and the first and second spring may be configured such that when the motion of the disk drive causes one of the first and second springs to be in tension, the other of the first and second springs is in compression. The generator enclosure-providing step may provide a generator enclosure having a hollow cylindrical shape, for example. The magnet-providing step may provide a magnet having a disk shape or a right cylindrical shape, for example. The coil-providing step may provide a coil having a generally toroidal shape, for example. The method may further include a step of storing the generated electrical energy in a local storage device and the charging step may charge the rechargeable battery from the local storage device. The local storage device may include one or more capacitors, the capacitor(s) being selectively discharged to charge the rechargeable battery. The charging step may be carried out only when the disk drive is not drawing electrical energy from the energy storage means. The charging step may be carried out only after a predetermined time period has elapsed during which no commands for reading or writing to the disk have been processed, for example.

DESCRIPTION OF PREFERRED EMBODIMENTS

Figure 1:
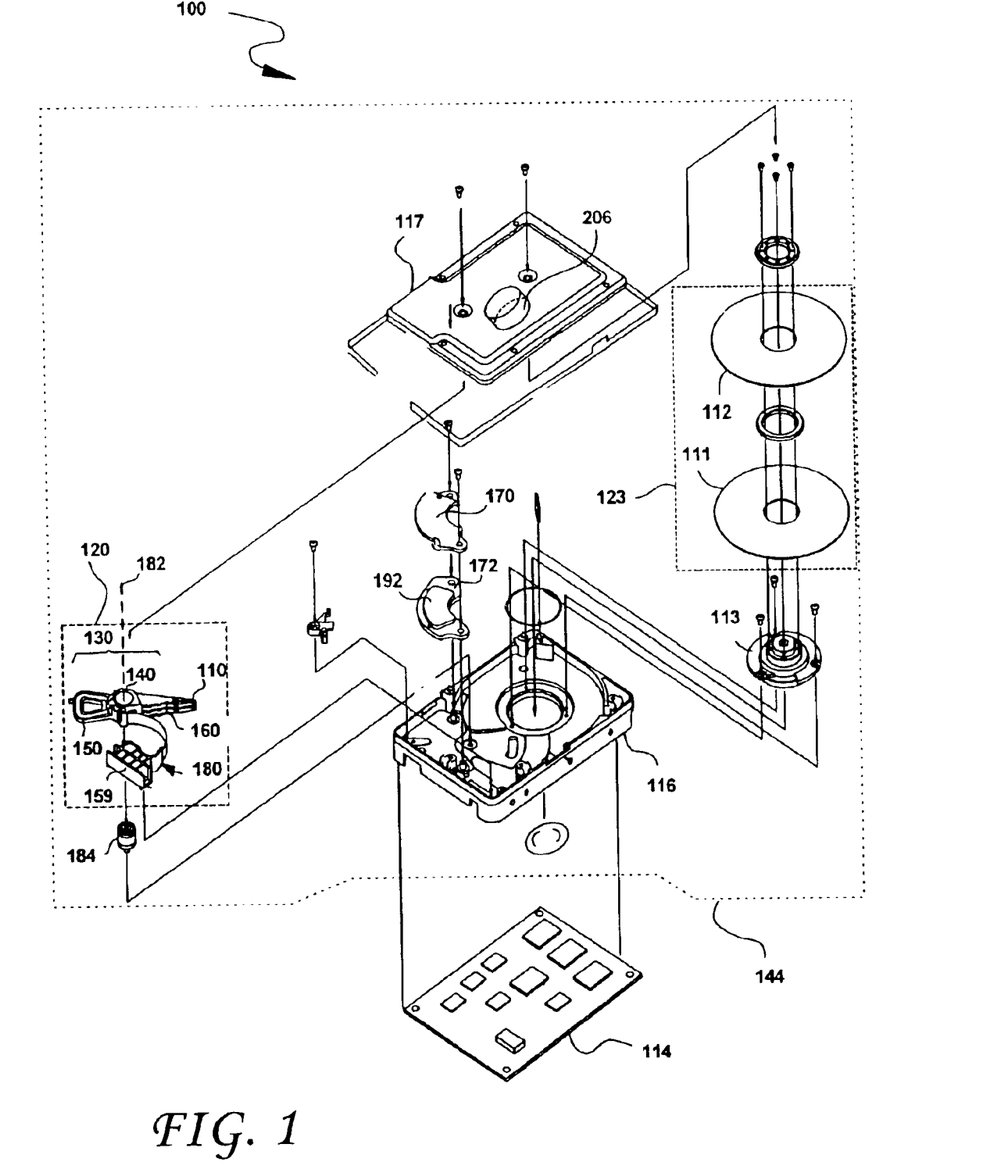
FIG. 1 is an exploded view of a disk drive according to an embodiment of the present invention.

FIG. 1 shows the principal components of a magnetic disk drive 100 constructed in accordance with the present invention. With reference to FIG. 1, the disk drive 100 comprises a HDA 144 and a PCBA 114. The HDA 144 includes a disk drive enclosure comprising base 116 and a cover 117 attached to the base 116 that collectively house a disk stack 123 that includes one or a plurality of magnetic disks (of which only a first disk 111 and a second disk 112 are shown), a spindle motor 113 attached to the base 116 for rotating the disk stack 123, an HSA 120, and a pivot bearing cartridge 184 that rotatably supports the HSA 120 on the base 116. The spindle motor 113 rotates the disk stack 123 at a constant angular velocity. The HSA 120 comprises a swing-type or rotary actuator assembly 130, at least one HGA 110, and a flex circuit cable assembly 180. The rotary actuator assembly 130 includes a body portion 140, at least one actuator arm 160 cantilevered from the body portion 140, and a coil portion 150 cantilevered from the body portion 140 in an opposite direction from the actuator arm 160. The actuator arm 160 supports the HGA 110 that, in turn, supports the slider(s). The flex cable assembly 180 may include a flex circuit cable and a flex clamp 159. The HSA 120 is pivotally secured to the base 116 via the pivot-bearing cartridge 184 so that the slider at the distal end of the HGA 110 may be moved over the surfaces of the disks 111, 112. The pivot-bearing cartridge 184 enables the HSA 120 to pivot about a pivot axis, shown in FIG. 1 at reference numeral 182. The storage capacity of the HDA 144 may be increased by, for example, increasing the track density (the TPI) on the disks 111, 112 and/or by including additional disks in the disk stack 123 and by an HSA 120 having a vertical stack of HGAs 110 supported by multiple actuator arms 160.

The "rotary" or "swing-type" actuator assembly comprises a body portion 140 that rotates on the pivot bearing 184 cartridge between limited positions, a coil portion 150 that extends from one side of the body portion 140 to interact with one or more permanent magnets 192 mounted to back irons 170, 172 to form the voice coil motor (VCM), and the actuator arm 160 that supports the HGA 110. The VCM causes the HSA 120 to pivot about the actuator pivot axis 182 to cause the slider and the read write transducers thereof to sweep radially over the disk(s) 111, 112. A transducer/generator 206 may be mounted to the disk drive 100 and/or to the host mobile device in which the disk drive 100 is mounted, as detailed below.

Figure 2:
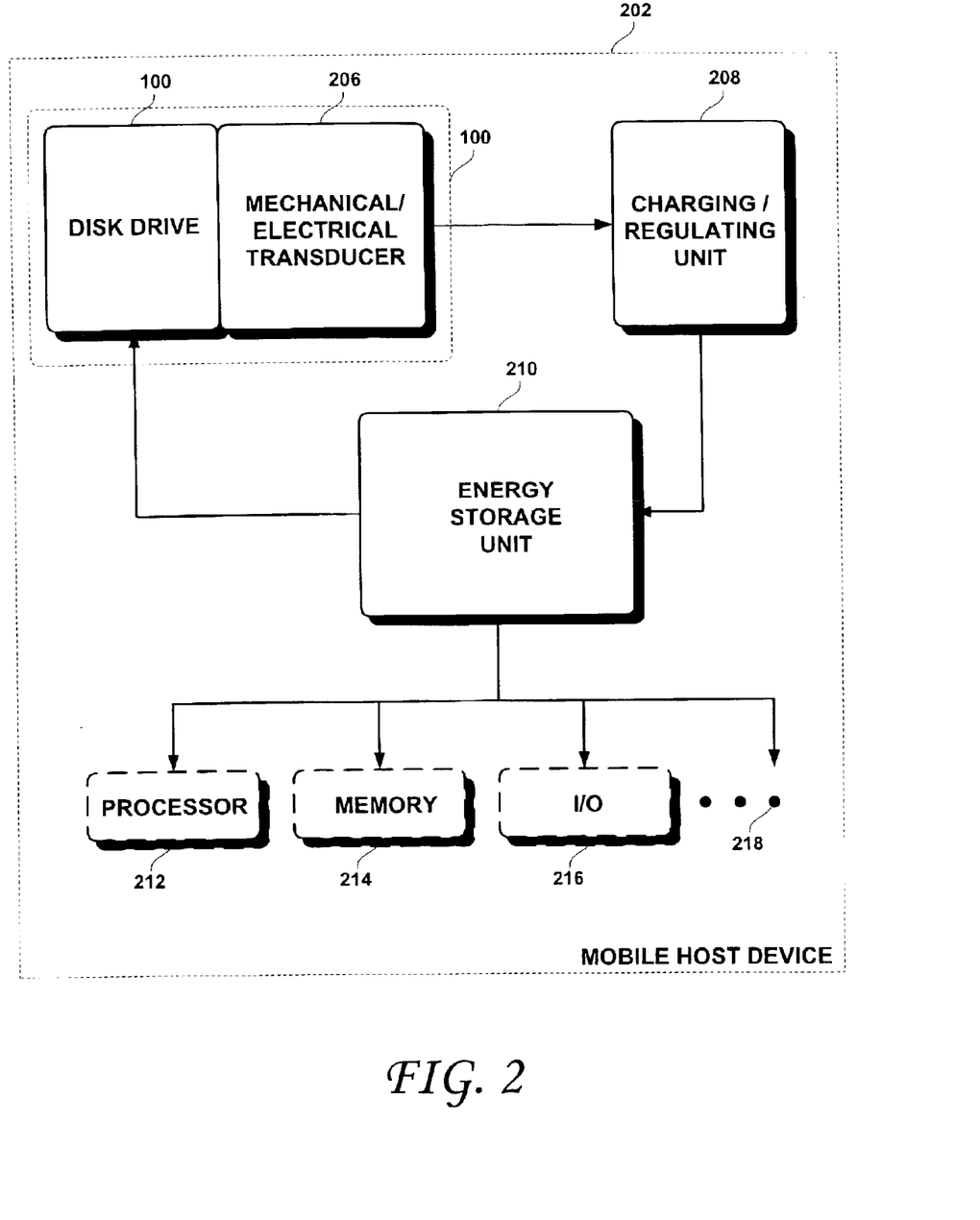
FIG. 2 is a block diagram of an embodiment of the present invention.

FIG. 2 is a block diagram of embodiments of the present invention. As shown, a transducer/generator (hereafter, generator) 206 may be coupled to the disk drive 100. Alternatively, the generator 206 may be attached to the host device that incorporates the disk drive 100. For example, the generator 206 may be attached to an exterior surface of the disk drive enclosure as shown in FIG. 1, may be attached within the disk drive enclosure or may be integrated into the disk drive 100, as suggested by the dashed line box 100 shown in FIG. 2. The disk drive 100 draws electrical energy from an energy storage unit 210 (such as a rechargeable battery, for example) to process and execute commands for reading and writing to the disk(s) 111, 112 incident to normal use of the disk drive 100. The disk drive 100 may be integrated into a mobile host device 202 (such as, for example, still and video cameras, PDAs, music players, telephones and mobile computing devices). As shown, the energy storage unit 210 may also supply electrical energy to other constituent components of the mobile host device 202, such as (for example) a processor 212, memory 214, Input/Output devices 216 and/or other components, collectively referenced at 218.

According to an embodiment of the present invention, the generator 206 may be coupled to the disk drive enclosure and generates electrical energy from the motion of the mobile host device 202. Such motion is preferably incident to normal use of the mobile host device 202. For example, the mobile host device 202 may be a mobile telephone or video camera. In such cases, the motion from which the generator 206 generates the electrical energy is the motion of the telephone or video camera as the user thereof carries the device around and/or uses it to place calls or make movies. As shown, the generator 206 may be coupled to a charging/regulating unit 208 that is configured to accept the electrical energy output from the generator 206, boost it, regulate it and use the boosted and regulated electrical energy to charge the energy storage unit 210. In this manner, the charging/regulating unit 208 conditions the boosted electrical energy into a form suitable for outputting to the energy storage unit 210, such as a DC electrical signal of the same magnitude as the nominal output of the energy storage unit 210. An example of a suitable charging/regulating unit 208 is described in co-pending and commonly assigned U.S. patent application Ser. No. 10/184,738 filed on Jun. 28, 2002, the disclosure of which is incorporated herein in its entirety. However, the present invention is not limited thereto as those of skill in this art will recognize that other charging/regulating units 208 may be implemented within the context of the present invention.

Figure 3:
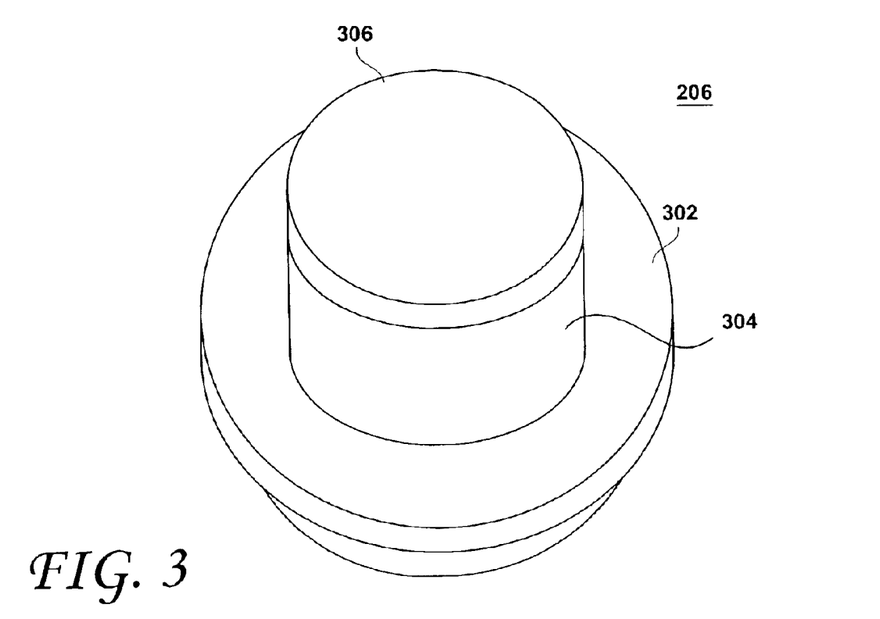
FIG. 3 shows an embodiment of an enclosure of a transducer/generator for converting the mechanical energy associated with the movement of the host device and/or disk drive into electrical energy to charge the energy storage device, according to the present invention.

FIG. 3 shows an embodiment of an enclosure of a transducer/generator for converting the mechanical energy associated with the movement of the host device and/or disk drive into electrical energy to charge an energy storage device, according to the present invention. The embodiment of the generator 206 shown in FIG. 3 includes a generator enclosure 304. The generator enclosure may include, for example, a plastic or other rigid material. The enclosure 304 may be shaped as a hollow cylinder whose two free ends (one visible in the perspective view of FIG. 3) are closed. The enclosure 304 shown in FIG. 3 is shown with a cap 306. The generator 206 also includes a conductive coil 302. The coil 302 includes, for example, many turns (e.g., over a 1,000) of conductive high gauge conductive (e.g., 35–40 AWG) wires that are wound in a generally toroidal shape (for example). The coil 302, in this embodiment, is coupled to an exterior surface of the enclosure 304 of the generator 206.

Figure 4:
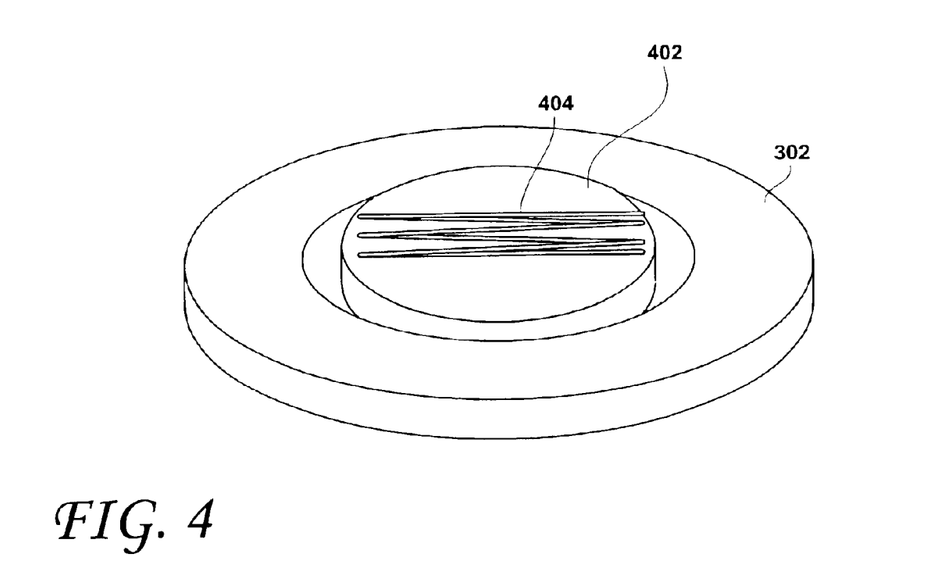
FIG. 4 shows an embodiment of the major components of the transducer/generator of FIG. 3, shown without the generator enclosure.

FIG. 4 shows an embodiment of the major components of the generator 206 of FIG. 3, shown without the enclosure 304. As shown, the generator 206 includes the coil 302 and a magnet 402 that is initially disposed and aligned, in this embodiment, within and with the center space of the toroidal (doughnut-shaped) coil 302. The magnet 402, for example, may be a high-energy NeFeB magnet. According to the present invention, the magnet 402 and the coil 302 are configured such that the motion of the mobile host device 202 and/or disk drive 100 causes the magnet 402 and the coil 302 to move relative to one another to generate the electrical energy. Indeed, as the magnet 402 and the coil 302 move relative to one another, a change in the magnetic field through the coil 302 is induced. The change in magnetic field produces a back electromotive force voltage across the coil 302. In turn, the voltage across the coil 302 (shown as $V_{out}$ in FIGS. 6–9) may be boosted and regulated by the charging/regulating unit 208 to charge the energy storage unit (e.g., rechargeable battery) 210. According to one embodiment, the magnet 402 and the coil 302 are configured such that the motion of the mobile host device 202 and/or disk drive 100 causes the magnet to move relative to a fixed coil 302 to generate the electrical energy. According to another embodiment, the magnet 402 and the coil 302 are configured such that the motion of the mobile host device 202 and/or disk drive 100 causes the coil 302 to move relative to a fixed magnet 402 to generate the electrical energy.

According to the embodiment shown in FIG. 35, the magnet 402 is disposed within the generator enclosure 304 such that the motion of the mobile host device 202 and/or disk drive 100 causes the magnet 402 to oscillate relative to the (fixed) coil 302. In this embodiment, the magnet 402 is sandwiched between a first spring 404 and a second spring 406. Within the context of the present invention, the term "spring" is not limited to helically wound springs but may be or include any suitable resilient means or elastomeric element. For example, the springs described herein and shown in the drawings may include leaf springs, elastomeric polymers or most any resilient element. The first and second springs 404, 406 may be configured such that when the motion of the disk drive 100 and/or host device 202 causes one of the first and second springs 404, 406 to be in tension, the other of the first and second springs 404, 406 is in compression, as will be detailed relative to FIGS. 6A–6C, 7A–7C and 8A–8C. In this embodiment, the first spring 404 may be attached within the enclosure 302 to the cap 306 and to a first surface of the magnet 402. Similarly, the second spring 406 may be attached within the enclosure 302 to a surface (referenced at 502 in FIG. 5) of the enclosure 304 that faces the cap 306 and to a second surface of the magnet 402, as shown in FIG. 4. In this manner, the magnet 402 is disposed within the generator enclosure 304 such that the motion of the mobile host device 202 and/or disk drive 100 causes the magnet 402 to oscillate relative to the coil 302, thereby inducing an electrical current in the coil 302 as the magnetic field through the coil 302 is changed by the oscillating magnet 402.

Figure 5:
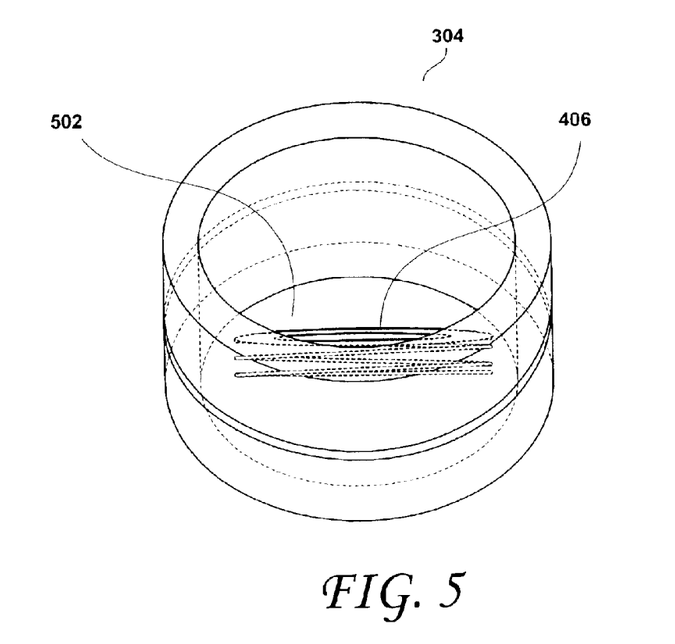
FIG. 5 shows a portion of the transducer/generator of FIG. 3 to illustrate certain mechanical aspects thereof.

FIG. 5 shows a portion of the generator 206 of FIG. 3 to illustrate certain mechanical aspects thereof. As shown, the generator enclosure 304 is shown without the cap 306 affixed thereon. In this embodiment, the enclosure 304 is shaped as a hollow cylinder, although other shapes are possible. The bottom surface 502 (which faces the interior surface of cap 306) is seen in this perspective view. FIG. 5 shows the enclosure 304 without the coil 302 attached thereto and shows the second magnet 406 attached to the surface 502 of the generator enclosure 304.

Figure 6A:
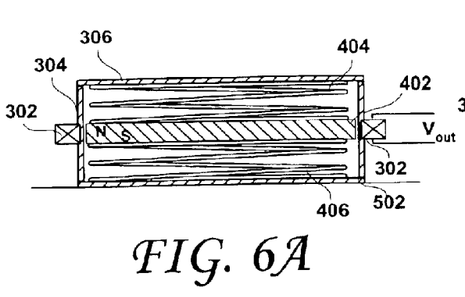
FIG. 6A shows, in cross-section, an embodiment of the transducer/generator according to the present invention.
Figure 6B:
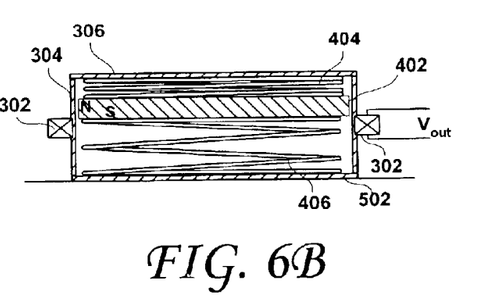
FIG. 6B shows, in cross-section, the transducer/generator of FIG. 6A in a first position, to illustrate the oscillatory motion of the magnet relative to the conductive coil thereof imposed by the motion of the host device and/or disk drive.
Figure 6C:
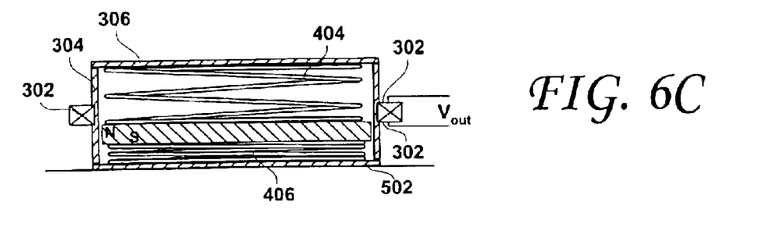
FIG. 6C shows, in cross-section, the transducer/generator of FIG. 6A in a second position, to illustrate the oscillatory motion of the magnet relative to the conductive coil thereof imposed by the motion of the host device and/or disk drive.

FIG. 6A shows, in cross-section, the generator 206 according to an illustrative embodiment of the present invention. The generators of FIGS. 6 and 7 define a relatively flat profile, in which the width of the generator 206 is greater than its height. In contrast, the embodiments of the present invention shown in FIGS. 8 and 9 define a relatively taller profile, wherein the height of the generator 206 is greater than its width. Other shapes and dimensions are possible, and FIGS. 6–9 are only intended as exemplary and non-limiting embodiments of the present invention. FIG. 6B shows, in cross-section, the generator 206 of FIG. 6A in a first position, to illustrate the oscillatory motion of the magnet 402 relative to the conductive coil 302 thereof imposed by the motion of the host device 202 and/or disk drive 100. FIG. 6C shows, in cross-section, the generator 206 of FIG. 6A in a second position, to further illustrate the oscillatory motion of the magnet 402 relative to the conductive coil 302 thereof imposed by the motion of the host device 202 and/or the disk drive 100. Considering now FIGS. 6A–6C collectively, the generator enclosure is shown at 304, the cap at 306, the bottom surface of the enclosure 304 at 502. The first spring shown at 404 and the second spring 406 are shown to sandwich the magnet 402, whose polarity is indicated by the N and S poles shown. The conductive coil 302 is seen in FIGS. 6A–6C as being coupled to the exterior surface of the enclosure 302. The situation wherein the disk drive 100 and the host device are not moving is shown at FIG. 6A. In this quiescent state, the magnet 402 is stationary relative to the coil 302 and aligned therewith. As shown in FIGS. 6A and 6B, when a motion is imposed upon the disk drive 100 and/or the mobile host device 202, the inertia of the magnet 402 causes a relative motion between the fixed coil 302 and the magnet 402. The restoring forces imposed upon the magnet 402 by the first and second springs 404, 406 allow this motion to be an oscillatory one as the magnet 402 travels within the generator enclosure 304 shown in FIGS. 6B and 6C. As shown in these figures, when the first magnet 404 is in compression, the second magnet 406 is in tension (FIG. 6B) and when the first magnet 404 is in tension, the second magnet 406 is in compression (FIG. 6C). This oscillatory motion induces a current through the conductive coil 302 as the magnetic field therethrough changes under the influence of the moving magnet 402.

Figure 7A:
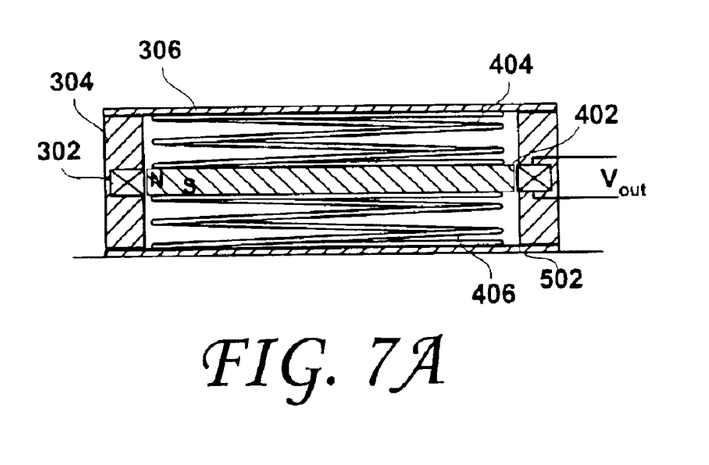
FIG. 7A shows, in cross-section, another embodiment of the transducer/generator according to the present invention.
Figure 7B:
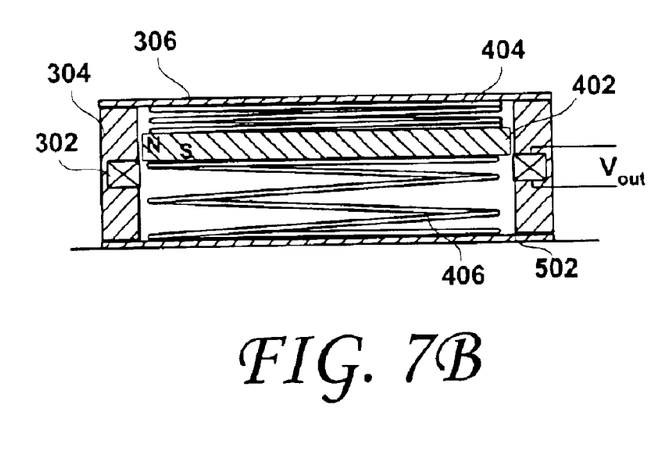
FIG. 7B shows, in cross-section, the transducer/generator of FIG. 7A in a first position, to illustrate the oscillatory motion of the magnet relative to the conductive coil thereof imposed by the motion of the host device and/or disk drive.
Figure 7C:
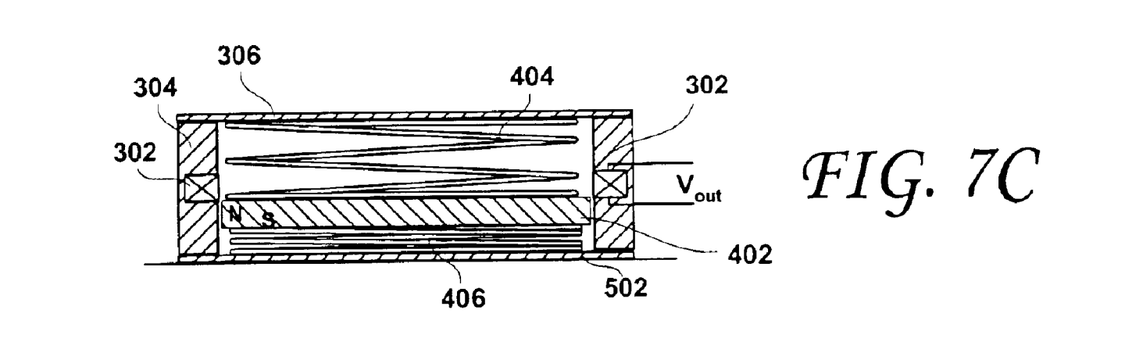
FIG. 7C shows, in cross-section, the transducer/generator of FIG. 7A in a second position, to illustrate the oscillatory motion of the magnet relative to the conductive coil thereof imposed by the motion of the host device and/or disk drive.

FIG. 7A shows, in cross-section, the generator 206 according to another embodiment of the present invention. FIG. 7B shows, in cross-section, the generator 206 of FIG. 7A in a first position, to illustrate the oscillatory motion of the magnet 402 relative to the conductive coil 302 thereof imposed by the motion of the host device 100 and/or disk drive 100. FIG. 7C shows, in cross-section, the generator of FIG. 7A in a second position, to further illustrate the oscillatory motion of the magnet 402 relative to the conductive coil 302 thereof imposed by the motion of the host device 202 and/or disk drive 100. In this embodiment, the coil 302 is attached within the enclosure 304, thereby resulting in a potentially more compact generator 206. The operation of this embodiment of the generator 206 is similar to that described relative to FIGS. 6A–6C.

Characteristics such as, for example, the dimensions of the generator enclosure 304, the nature of, dimensions and travel of the magnet 402, the number of windings, wire gauge and/or travel of the coil 302 and the force of the spring constant K (from Hooke's law F=−Kx) of the spring(s) 404, 406 may be chosen so as to tune the excitation of the mass-spring system (including the magnet 402 and the spring or springs 404, 406) at selected frequencies.

Figure 8A:
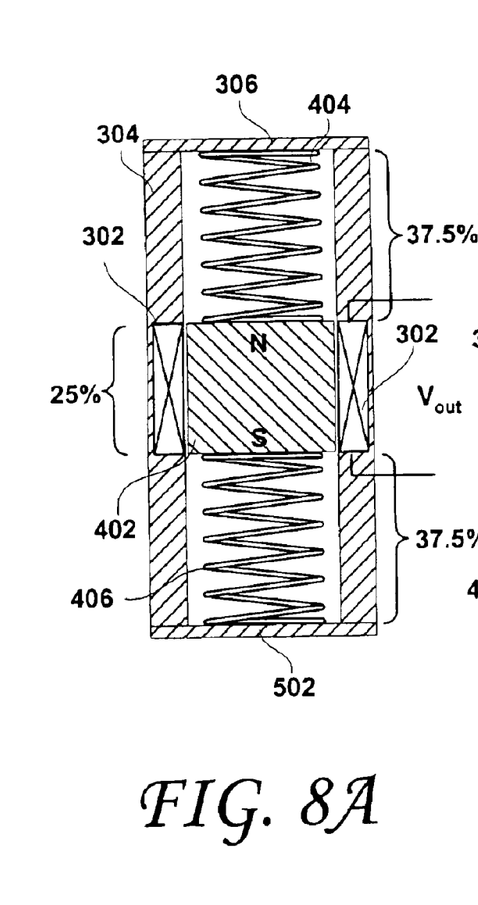
FIG. 8A shows, in cross-section, another embodiment of the transducer/generator according to the present invention.
Figure 8B:
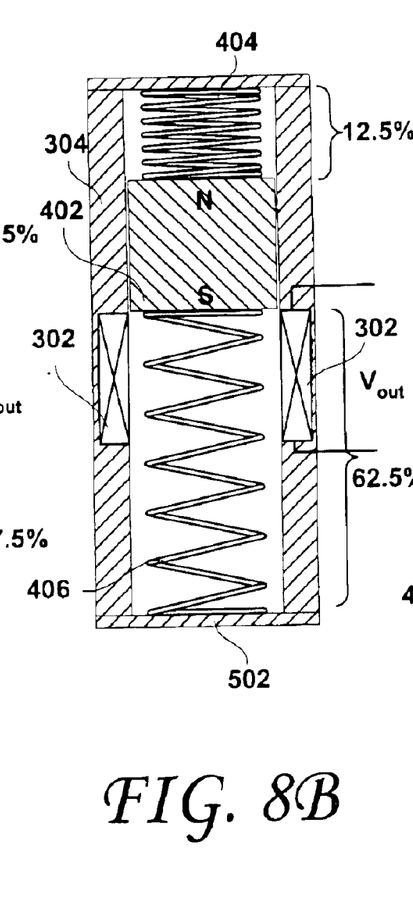
FIG. 8B shows, in cross-section, the transducer/generator of FIG. 8A in a first position, to illustrate the oscillatory motion of the magnet relative to the conductive coil thereof imposed by the motion of the host device and/or disk drive.
Figure 8C:
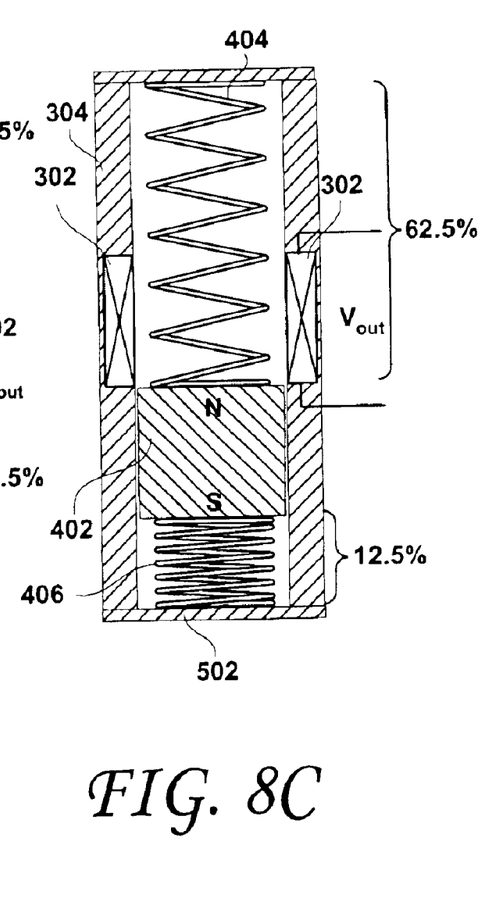
FIG. 8C shows, in cross-section, the transducer/generator of FIG. 8A in a second position, to illustrate the oscillatory motion of the magnet relative to the conductive coil thereof imposed by the motion of the host device and/or disk drive.

FIG. 8A shows, in cross-section, another embodiment of the transducer/generator according to the present invention. As shown therein, the generator enclosure 304 may have a right cylindrical shape, and may be dimensioned similar to the (absolute or relative) dimensions of an "AA" size battery. In this embodiment, the coil 302 is fixed relative to the enclosure 304 and the magnet 402 and a first and second spring 404, 406 are coupled within the enclosure 304 to the magnet 402 and to the structures referenced at numerals 306 and 502 to enable the magnet 403 to oscillate when the disk drive and/or mobile host device is moved. FIGS. 8A, 8B and 8C illustrate exemplary relative dimensions of the constituent elements of the generator 206 of the present invention. As shown, the magnet 402 and the coil 302 may each span about 25% of the length of the generator (relative to the longitudinal axis thereof). The first and second springs 404, 406 may each span about 37.5% of the length of the generator and may be selected so as to compress and extend a maximum of about 12.5% from their quiescent (unstretched and uncompressed) length (shown in FIG. 8A). FIGS. 8A and 8B illustrate, in cross-section the generator of FIG. 8A, upon being subjected to motion. As shown, FIG. 8B shows the first magnet 404 compressing to about 12.5% the length of the generator and the second magnet 406 extending by an approximate equal amount, now extending over about 62.5% of the length of the generator. FIG. 8C shows the magnet 402 traveling so as to similarly compress the second spring 406 and extending the first spring 404. When the disk drive and/or mobile host unit is subjected to a motion, the restoring forces exerted by the first and second spring 404, 406 (one in compression, the other in tension), cause the magnet 402 to undergo an oscillatory motion and to induce a current flow in the windings of the coil 302.

According to the present invention, the greater the rate of change of the magnetic field within the coil 302, the greater the magnitude of the induced current. For example, choosing a stiffer spring or springs will result in higher rates of change of the magnetic field within the coil, correspondingly lower amplitudes of the generated electrical energy and a faster rate of decay of the oscillations of the magnet 402 within the enclosure. Conversely, choosing a less stiff spring or springs (all other generator characteristics remaining the same) will result in higher rates of change of the magnetic field within the coil, correspondingly lower amplitudes of the generated electrical energy and a slower rate of decay of the oscillations of the magnet 402 within the enclosure.

Figures 9A, 9B:
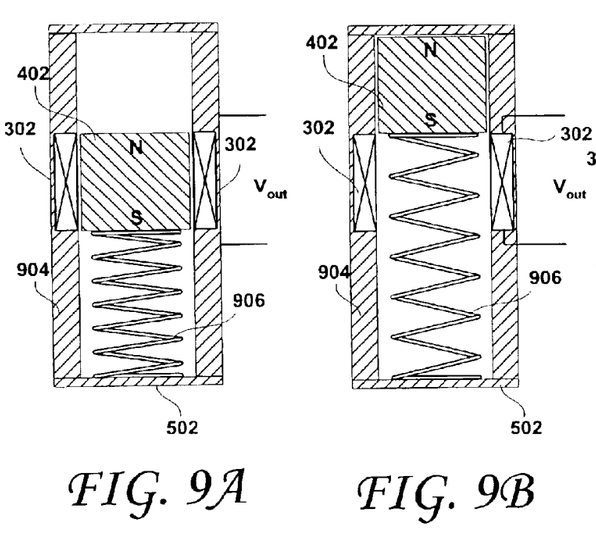
FIG. 9A shows, in cross-section, an embodiment of a single spring transducer/generator according to the present invention.
FIG. 9B shows, in cross-section, the transducer/generator of FIG. 9A in a first position, to illustrate the oscillatory motion of the magnet relative to the conductive coil thereof imposed by the motion of the host device and/or disk drive.
Figure 9C:
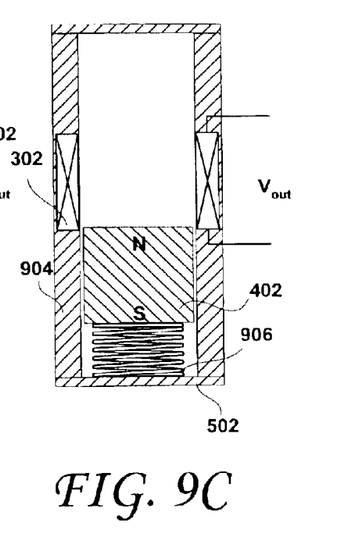
FIG. 9C shows, in cross-section, the transducer/generator of FIG. 9A in a second position, to illustrate the oscillatory motion of the magnet relative to the conductive coil thereof imposed by the motion of the host device and/or disk drive.

FIG. 9A shows, in cross-section, an embodiment of a single spring transducer/generator according to the present invention. As shown, the transducer/generator shown in FIGS. 9A–9C includes a single spring 906. The remainder of this embodiment is similar to that discussed above.

Figure 10:
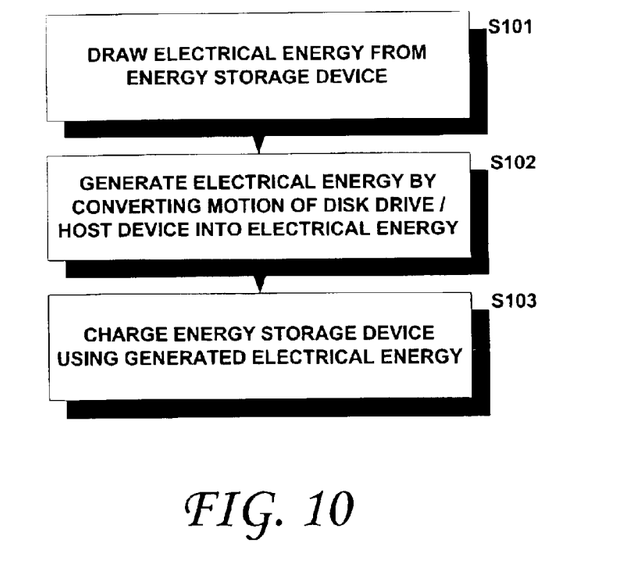
FIG. 10 is a flowchart of a method of operating a disk drive, according to an embodiment of the present invention.

FIG. 10 is a flowchart of a method of operating a disk drive, according to an embodiment of the present invention. As shown, the method includes a step S101 of drawing electrical energy from an energy storage unit such as shown at 210 in FIG. 2 (e.g., a rechargeable battery) to process and execute commands for reading and writing to the disk(s) 111, 112 (incident to normal use of the disk drive 100, for example). Step S102 calls for generating electrical energy by converting the motion of the disk drive 100 and/or that of a mobile device 202 that incorporates the disk drive 100 into electrical energy, as detailed above. Step S103 calls for charging the energy storage unit 210 using the generated electrical energy. An intermediate step of storing the generated electrical energy in a local storage device may be carried out. The local storage device may, for example, include a capacitor or an array of capacitors that are configured to be selectively discharged to charge the energy storage unit 210. The charging step at S103 may the charge the energy storage unit 210 from the local storage device. According to an embodiment of the present invention, the charging step S103 may be carried out only when the disk drive 100 is not actively writing to or reading from the disk(s) 111, 112. For example, step S103 may only be carried out, according to an embodiment of the present invention, after a predetermined time period has elapsed during which no commands for reading or writing to the disk(s) 1111, 112 have been processed, although other timing schemes may readily be devised, as those of skill may recognize.

Advantageously, the present invention enables the operational time of a mobile host device and/or disk drive to be extended by converting the mechanical energy associated with the movement of the mobile host device and/or disk drive into electrical energy that may be used to charge the energy storage device.

We claim:

1. A mobile host device configured to draw electrical energy from an energy storage device, the mobile host device comprising:
    a disk drive, the disk drive comprising:
        a disk drive enclosure including a base;
        a spindle motor attached to the base;
        a disk positioned on the spindle motor;
    a generator, the generator being coupled to one of the disk drive enclosure and the mobile host device, the generator including a generator enclosure; a conductive coil disposed within the generator enclosure, a first spring, a second spring and a magnet sandwiched between the first and second springs such that when the motion of the mobile host device causes one of the first and second springs to be in tension, the other of the first and second springs is in compression, causing the magnet to oscillate relative to the coil to generate electrical energy, and
    a charging circuit, the charging circuit being configured to charge the energy storage device using the electrical energy generated by the generator.

2. The mobile host device of claim 1, wherein the energy storage device is a rechargeable battery.

3. The mobile host device of claim 1, wherein the generator enclosure has a hollow cylindrical shape.

4. The mobile device of claim 1, wherein the magnet has a disk shape.

5. The mobile device of claim 1, wherein the magnet has a right cylindrical shape.

6. The mobile host device of claim 1, wherein the coil has a toroidal shape.

7. The mobile host device of claim 1, wherein the generator is disposed within the disk drive enclosure.

8. The mobile host device of claim 1, wherein the generator is attached to an outside surface of the disk drive enclosure.

9. A disk drive for use with a mobile device configured to draw electrical energy from an energy storage device, the disk drive comprising:
    a disk drive enclosure including a base;
    a spindle motor attached to the base;
    a disk positioned on the spindle motor;
    a generator, the generator being coupled to the disk drive enclosure, the generator including a generator enclosure, a conductive coil disposed within the generator enclosure, and a magnet disposed within the generator enclosure, the coil and the magnet being configured such that the motion of the disk drive enclosure causes the magnet to oscillate relative to the coil to generate electrical energy; and
    a charging circuit, the charging circuit being configured to charge the energy storage device using the electrical energy generated by the generator.

10. The disk drive of claim 9, wherein the energy storage device is a rechargeable battery and wherein the charging circuit is configured to charge the rechargeable battery.

11. The disk drive of claim 9, further comprising a spring that is configured to enable the magnet to oscillate relative to the coil.

12. The disk drive of claim 9, wherein the magnet is sandwiched between a first spring and a second spring, the first and second spring being configured such that when the motion of the disk drive causes one of the first and second springs to be in tension, the other of the first and second springs is in compression.

13. The disk drive of claim 9, wherein the generator enclosure has a hollow cylindrical shape.

14. The disk drive of claim 9, wherein the magnet has a disk shape.

15. The disk drive of claim 9, wherein the magnet has a right cylindrical shape.

16. The disk drive of claim 9, wherein the coil has a toroidal shape.

17. The disk drive of claim 9, wherein the generator is disposed within the disk drive enclosure.

18. The disk drive of claim 9, wherein the generator is attached to an outside surface of the disk drive enclosure.

19. Method of operating a disk drive, comprising:
drawing electrical energy from an energy storage device to process and execute commands for reading and writing to the disk;
generating electrical energy by converting a motion of the disk drive into electrical energy, the generating step including providing a generator enclosure; providing a conductive coil disposed within the generator enclosure, and providing a magnet within the generator enclosure such that motion of the disk drive causes the magnet to oscillate relative to the coil to generate the electrical energy; and
charging the energy storage device using the generated electrical energy.

20. The method of claim 19, wherein the energy storage device is a rechargeable battery and wherein the drawing step draws electrical energy from the rechargeable battery.

21. The method of claim 20, further including a step of storing the generated electrical energy in a local storage device and wherein the charging step charges the rechargeable battery from the local storage device.

22. The method of claim 21, wherein the local storage device includes at least one capacitor, the at least one capacitor being selectively discharged to charge the rechargeable battery.

23. The method of claim 19, wherein the magnet providing step also provides a spring within the generator enclosure, the spring being configured to enable the magnet to oscillate relative to the coil.

24. The method of claim 19, further comprising a step of sandwiching the magnet between a first spring and a second spring, the first and second spring being configured such that when the motion of the disk drive causes one of the first and second springs to be in tension, the other of the first and second springs is in compression.

25. The method of claim 19, wherein the generator enclosure-providing step provides a generator enclosure having a hollow cylindrical shape.

26. The method of claim 19, wherein the magnet-providing step provides a magnet having a disk shape.

27. The method of claim 19, wherein the magnet providing step provides a magnet having a right cylindrical shape.

28. The method of claim 19, wherein the coil providing step provides a coil having a generally toroidal shape.

29. The method of claim 19, wherein the charging step is carried out when the disk drive is not drawing electrical energy from the energy storage device.

30. The method of claim 19, wherein the charging step is carried out only after a predetermined time period has elapsed during which no commands for reading or writing to the disk have been processed.

31. A mobile host device configured to draw electrical energy from an energy storage device, the mobile host device comprising:
a disk drive, the disk drive comprising:
a disk drive enclosure including a base;
a spindle motor attached to the base;
a disk positioned on the spindle motor;
a generator, the generator being coupled to one of the disk drive enclosure and the mobile host device, the generator including a generator enclosure, a magnet and a conductive coil sandwiched between a first spring and a second spring, the first and second spring being configured such that when the motion of the mobile host device causes one of the first and second springs to be in tension, the other of the first and second springs is in compression, such that the coil oscillates relative to the magnet to generate electrical energy, and
a charging circuit, the charging circuit being configured to charge the energy storage device using the electrical energy generated by the generator.

32. The mobile host device of claim 31, wherein the energy storage device is a rechargeable battery.

33. The mobile host device of claim 31, wherein the generator enclosure has a hollow cylindrical shape.

34. The mobile device of claim 31, wherein the magnet has a disk shape.

35. The mobile device of claim 31, wherein the magnet has a right cylindrical shape.

36. The mobile host device of claim 31, wherein the coil has a toroidal shape.

37. The mobile host device of claim 31, wherein the generator is disposed within the disk drive enclosure.

38. The mobile host device of claim 31, wherein the generator is attached to an outside surface of the disk drive enclosure.

39. A disk drive for use with a mobile device configured to draw electrical energy from an energy storage device, the disk drive comprising:
a disk drive enclosure including a base;
a spindle motor attached to the base;
a disk positioned on the spindle motor;
a generator, the generator being coupled to the disk drive enclosure, the generator including a generator enclosure, a conductive coil disposed within the generator enclosure, and a magnet disposed within the generator enclosure, the coil and the magnet being configured such that the motion of the disk drive causes the coil to oscillate relative to the magnet to generate electrical energy; and
a charging circuit, the charging circuit being configured to charge the energy storage device using the electrical energy generated by the generator.

40. The disk drive of claim 39, wherein the energy storage device is a rechargeable battery and wherein the charging circuit is configured to charge the rechargeable battery.

41. The disk drive of claim 39, further comprising a spring disposed within the generator enclosure, the spring being configured to enable the coil to oscillate relative to the magnet.

42. The disk drive of claim 39, wherein the coil is sandwiched between a first spring and a second spring, the first and second spring being configured such that when the motion of the disk drive causes one of the first and second springs to be in tension, the other of the first and second springs is in compression.

43. The disk drive of claim 39, wherein the generator enclosure has a hollow cylindrical shape.

44. The disk drive of claim 39, wherein the magnet has a disk shape.

45. The disk drive of claim 39, wherein the magnet has a right cylindrical shape.

46. The disk drive of claim 39, wherein the coil has a toroidal shape.

47. The disk drive of claim 39, wherein the generator is disposed within the disk drive enclosure.

48. The disk drive of claim 39, wherein the generator is attached to an outside surface of the disk drive enclosure.

49. Method of operating a disk drive, comprising:
drawing electrical energy from an energy storage device to process and execute commands for reading and writing to the disk;
generating electrical energy by converting a motion of the disk drive into electrical energy, the generating step including providing a generator enclosure, providing a conductive coil disposed within the generator enclosure, and providing a magnet the coil and the magnet being disposed such that the motion of the disk drive causes the coil to oscillate relative to the magnet to generate the electrical energy; and
charging the energy storage device using the generated electrical energy.

50. The method of claim 49, wherein the energy storage device is a rechargeable battery and wherein the drawing step draws electrical energy from the rechargeable battery.

51. The method of claim 50, further including a step of storing the generated electrical energy in a local storage device and wherein the charging step charges the rechargeable battery from the local storage device.

52. The method of claim 51, wherein the local storage device includes at least one capacitor, the at least one capacitor being selectively discharged to charge the rechargeable battery.

53. The method of 52, wherein the magnet providing step also provides a spring within the generator enclosure, the spring being configured to enable the coil to oscillate relative to the magnet.

54. The method of claim 53 further comprising a step of sandwiching the coil between a first spring and a second spring, the first and second spring being configured such that when the motion of the disk drive causes one of the first and second springs to be in tension, the other of the first and second springs is in compression.

55. The method of claim 52, wherein the generator enclosure-providing step provides a generator enclosure having a hollow cylindrical shape.

56. The method of claim 52, wherein the magnet-providing step provides a magnet having a disk shape.

57. The method of claim 52, wherein the magnet providing step provides a magnet having a right cylindrical shape.

58. The method of claim 52, wherein the coil providing step provides a coil having a generally toroidal shape.

59. The method of claim 49, wherein the charging step is carried out when the disk drive is not drawing electrical energy from the energy storage device.

60. The method of claim 49, wherein the charging step is carried out only after a predetermined time period has elapsed during which no commands for reading or writing to the disk have been processed.

61. Method of operating a disk drive, comprising:
drawing electrical energy from an energy storage device to process and execute commands for reading and writing to the disk;
generating electrical energy by converting a motion of the disk drive into electrical energy;
storing the generated electrical energy in a local storage device; and
charging the energy storage device using the generated electrical energy stored in the local storage device.

62. The method of claim 61, wherein the energy storage device is a rechargeable battery and wherein the drawing step draws electrical energy from the rechargeable battery.

63. The method of claim 62, wherein the local storage device includes at least one capacitor, the at least one capacitor being selectively discharged to charge the rechargeable battery.

64. The method of claim 61, wherein the generating step includes providing a magnet and a conductive coil, and disposing the magnet and the coil such that the motion of the disk drive causes the magnet and the coil to move relative to one another to generate the electrical energy.

65. The method of claim 61, wherein the generating step includes providing a magnet and a conductive coil, and disposing the magnet and the coil such that the motion of the disk drive causes the magnet to move relative to the coil to generate the electrical energy.

66. The method of claim 61, wherein the generating step includes providing a magnet and a conductive coil, and disposing the magnet and the coil such that the motion of the disk drive causes the coil to move relative to the magnet to generate the electrical energy.

67. The method of claim 61, wherein the generating step includes:
providing a generator enclosure;
providing a conductive coil disposed within the generator enclosure; and
providing a magnet, the coil and the magnet disposed such that the motion of the disk drive enclosure causes the coil and the magnet to move relative to one another to generate the electrical energy.

68. The method of claim 67, wherein the magnet providing step disposes the magnet within the generator enclosure such that the motion of the disk drive causes the magnet to oscillate relative to the coil.

69. The method of claim 68, wherein the magnet providing step also provides a spring within the generator enclosure, the spring being configured to enable the magnet to oscillate relative to the coil.

70. The method of claim 68, further comprising a step of sandwiching the magnet between a first spring and a second spring, the first and second spring being configured such that when the motion of the disk drive causes one of the first and second springs to be in tension, the other of the first and second springs is in compression.

71. The method of claim 66, wherein the coil providing step disposes the coil within the generator enclosure such that the motion of the disk drive causes the coil to oscillate relative to the magnet.

72. The method of claim 71, wherein the magnet providing step also provides a spring within the generator enclosure, the spring being configured to enable the coil to oscillate relative to the magnet.

73. The method of claim 71, further comprising a step of sandwiching the coil between a first spring and a second spring, the first and second spring being configured such that when the motion of the disk drive causes one of the first and second springs to be in tension, the other of the first and second springs is in compression.

74. The method of claim 67, wherein the generator enclosure-providing step provides a generator enclosure having a hollow cylindrical shape.

75. The method of claim 67, wherein the magnet-providing step provides a magnet having a disk shape.

76. The method of claim 67, wherein the magnet providing step provides a magnet having a right cylindrical shape.

77. The method of claim 67, wherein the coil providing step provides a coil having a generally toroidal shape.

78. The method of claim 61, wherein the charging step is carried out when the disk drive is not drawing electrical energy from the energy storage device.

79. The method of claim 61, wherein the charging step is carried out only after a predetermined time period has elapsed during which no commands for reading or writing to the disk have been processed.

80. Method of operating a disk drive, comprising:
   drawing electrical energy from an energy storage device to process and execute commands for reading and writing to the disk;
   generating electrical energy by converting a motion of the disk drive into electrical energy; and
   charging the energy storage device using the generated electrical energy only after a predetermined time period has elapsed during which no commands for reading or writing to the disk have been processed.

81. The method of claim 80, wherein the energy storage device is a rechargeable battery and wherein the drawing step draws electrical energy from the rechargeable battery.

82. The method of claim 81, further including a step of storing the generated electrical energy in a local storage device and wherein the charging step charges the rechargeable battery from the local storage device.

83. The method of claim 82, wherein the local storage device includes at least one capacitor, the at least one capacitor being selectively discharged to charge the rechargeable battery.

84. The method of claim 80, wherein the generating step includes providing a magnet and a conductive coil and disposing the magnet and the coil such that the motion of the disk drive causes the magnet and the coil to move relative to one another to generate the electrical energy.

85. The method of claim 80, wherein the generating step includes providing a magnet and a conductive coil, and disposing the magnet and the coil such that the motion of the disk drive causes the magnet to move relative to the coil to generate the electrical energy.

86. The method of claim 80, wherein the generating step includes providing a magnet and a conductive coil, and disposing the magnet and the coil such that the motion of the disk drive causes the coil to move relative to the magnet to generate the electrical energy.

87. The method of claim 80, wherein the generating step includes:
   providing a generator enclosure;
   providing a conductive coil disposed within the generator enclosure, and providing a magnet, the coil and the magnet disposed such that the motion of the disk drive enclosure causes the coil and the magnet to move relative to one another to generate the electrical energy.

88. The method of claim 87, wherein the magnet providing step disposes the magnet within the generator enclosure such that the motion of the disk drive causes the magnet to oscillate relative to the coil.

89. The method of claim 88, wherein the magnet providing step also provides a spring within the generator enclose, the spring being configured to enable the magnet to oscillate relative to the coil.

90. The method of claim 88, further comprising a step of sandwiching the magnet between a first spring and a second spring, the first and second spring being configured such that when the motion of the disk drive causes one of the first and second springs to be in tension, the other of the first and second springs is in compression.

91. The method of claim 87, wherein the coil providing step disposes the coil within the generator enclosure such that the motion of the disk drive causes the coil to oscillate relative to the magnet.

92. The method of claim 91, wherein the magnet providing step also provides a spring within the generator enclosure, the spring being configured to enable the coil to oscillate relative to the magnet.

93. The method of claim 91, further comprising a step of sandwiching the coil between a first spring and a second spring, the first and second spring being configured such that when the motion of the disk drive causes one of the first and second springs to be in tension, the other of the first and second springs is in compression.

94. The method of claim 87, wherein the generator enclosure providing step provides a generator enclosure having a hollow cylindrical shape.

95. The method of claim 87, wherein the magnet-providing step provides a magnet having a disk shape.

96. The method of claim 87, wherein the magnet providing step provides a magnet having a right cylindrical shape.

97. The method of claim 87, wherein the coil providing step provides a coil having a generally toroidal shape.

98. The method of claim 80, wherein the charging step is carried out when the disk drive is not drawing electrical energy from the energy storage device.

* * * * *